United States Patent
Yang et al.

(10) Patent No.: US 10,732,771 B2
(45) Date of Patent: Aug. 4, 2020

(54) FINGERPRINT SENSORS HAVING IN-PIXEL OPTICAL SENSORS

(71) Applicant: Shenzhen Huiding Technology Co., Ltd., Shenzhen (CN)

(72) Inventors: Meng-Da Yang, Taipei (TW); Bo Pi, Carlsbad, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 508 days.

(21) Appl. No.: 14/583,048

(22) Filed: Dec. 24, 2014

(65) Prior Publication Data

US 2016/0132712 A1 May 12, 2016

Related U.S. Application Data

(60) Provisional application No. 62/078,427, filed on Nov. 12, 2014.

(51) Int. Cl.
*G06F 3/044* (2006.01)
*G06K 9/00* (2006.01)

(52) U.S. Cl.
CPC ........... *G06F 3/044* (2013.01); *G06K 9/0002* (2013.01); *G06K 9/0004* (2013.01); *G06K 9/00892* (2013.01); *G06K 2009/00939* (2013.01)

(58) Field of Classification Search
CPC ............................ G06F 3/044; G06K 9/00892
See application file for complete search history.

(56) References Cited

U.S. PATENT DOCUMENTS

| | | | |
|---|---|---|---|
| 5,420,936 | A | 5/1995 | Fitzpatrick et al. |
| 5,446,290 | A | 8/1995 | Fujieda et al. |
| 5,726,443 | A | 3/1998 | Immega et al. |

(Continued)

FOREIGN PATENT DOCUMENTS

| | | |
|---|---|---|
| CN | 1251650 A | 4/2000 |
| CN | 1417751 A | 5/2003 |

(Continued)

OTHER PUBLICATIONS

European Examination Report dated Sep. 24, 2018 for European Patent Application No. 15858516.6, filed on Nov. 12, 2015 (6 pages).

(Continued)

*Primary Examiner* — William C Vaughn, Jr.
*Assistant Examiner* — Jerry Jean Baptiste
(74) *Attorney, Agent, or Firm* — Perkins Coie LLP

(57) ABSTRACT

In one aspect, a fingerprint sensor device for fingerprint detection includes a light source configured to emit light at a wavelength. The fingerprint sensor device includes an array of sensor pixels to acquire an optical image indicative of a fingerprint. Each sensor pixel includes a photodetector to detect the emitted light reflected off of a target finger and output an optical signal based on the detected reflected light. Each sensor pixel includes a collimator disposed over the photodetector to direct the reflected light in a substantially vertical direction from above the photodetector toward the photodetector. Each sensor pixel includes sensor signal detection circuitry communicatively coupled to the photodetector to acquire the outputted optical signal.

26 Claims, 11 Drawing Sheets

(56) References Cited

U.S. PATENT DOCUMENTS

| | | |
|---|---|---|
| 5,953,441 A | 9/1999 | Setlak |
| 6,292,576 B1 | 9/2001 | Brownlee |
| 6,327,376 B1 | 12/2001 | Harkin |
| 7,535,468 B2 | 5/2009 | Uy |
| 7,728,959 B2 | 6/2010 | Waldman et al. |
| 7,751,595 B2 | 7/2010 | Russo |
| 7,936,907 B2 | 5/2011 | Maurer et al. |
| 9,829,614 B2 | 11/2017 | Smith et al. |
| 9,946,375 B2 | 4/2018 | Akhavan et al. |
| 9,990,533 B2 | 6/2018 | Pi et al. |
| 2003/0044051 A1 | 3/2003 | Fujieda |
| 2003/0090650 A1 | 5/2003 | Fujieda |
| 2004/0252867 A1* | 12/2004 | Lan ............... G06K 9/0004 382/124 |
| 2005/0168746 A1* | 8/2005 | Ohtsuka ............ B82Y 15/00 356/445 |
| 2006/0115128 A1 | 6/2006 | Mainguet |
| 2007/0035843 A1 | 2/2007 | Cassarly |
| 2007/0098227 A1 | 5/2007 | Takahashi |
| 2007/0109438 A1 | 5/2007 | Duparre et al. |
| 2007/0147667 A1 | 6/2007 | Sumita et al. |
| 2007/0211926 A1 | 9/2007 | Shinzaki et al. |
| 2007/0253607 A1 | 11/2007 | Higuchi |
| 2008/0121442 A1 | 5/2008 | Boer et al. |
| 2008/0122803 A1 | 5/2008 | Izadi et al. |
| 2008/0237766 A1 | 10/2008 | Kim |
| 2009/0021487 A1 | 1/2009 | Tien |
| 2009/0166411 A1 | 7/2009 | Kramer et al. |
| 2009/0232367 A1 | 9/2009 | Shinzaki |
| 2010/0008552 A1 | 1/2010 | Shin et al. |
| 2010/0113952 A1 | 5/2010 | Raguin et al. |
| 2010/0220900 A1* | 9/2010 | Orsley ............ G06F 3/0421 382/124 |
| 2010/0321152 A1 | 12/2010 | Argudyaev et al. |
| 2011/0233383 A1 | 9/2011 | Oku |
| 2012/0019744 A1 | 1/2012 | Lee |
| 2012/0069042 A1 | 3/2012 | Ogita et al. |
| 2012/0074406 A1* | 3/2012 | Saitou ........... G02F 1/13318 257/53 |
| 2012/0105614 A1 | 5/2012 | Wu et al. |
| 2012/0182266 A1 | 7/2012 | Han |
| 2012/0274603 A1* | 11/2012 | Kim ............... G06F 3/0412 345/174 |
| 2013/0051635 A1 | 2/2013 | Wu et al. |
| 2013/0120760 A1 | 5/2013 | Raguin et al. |
| 2013/0222282 A1 | 8/2013 | Huang et al. |
| 2013/0287272 A1 | 10/2013 | Lu et al. |
| 2013/0314377 A1 | 11/2013 | Los |
| 2014/0016047 A1 | 1/2014 | Hwang et al. |
| 2014/0036168 A1 | 2/2014 | Ludwig |
| 2014/0125788 A1 | 5/2014 | Wu |
| 2014/0168167 A1 | 6/2014 | Chou |
| 2014/0218327 A1 | 8/2014 | Shi et al. |
| 2014/0354905 A1 | 12/2014 | Kitchens et al. |
| 2014/0368764 A1 | 12/2014 | Lee et al. |
| 2015/0078633 A1 | 3/2015 | Hung |
| 2015/0186705 A1* | 7/2015 | Magi ............... G06K 9/0002 382/125 |
| 2015/0220767 A1 | 8/2015 | Yoon et al. |
| 2015/0257645 A1* | 9/2015 | Bae ............... A61B 5/7225 340/870.07 |
| 2016/0004899 A1 | 1/2016 | Pi et al. |
| 2016/0026844 A1 | 1/2016 | Kim et al. |
| 2016/0042216 A1 | 2/2016 | Yang et al. |
| 2016/0104025 A1 | 4/2016 | Thompson et al. |
| 2016/0132712 A1 | 5/2016 | Yang et al. |
| 2016/0148036 A1 | 5/2016 | Kim et al. |
| 2016/0180146 A1 | 6/2016 | Setterberg et al. |
| 2016/0224816 A1 | 8/2016 | Smith et al. |
| 2016/0247010 A1 | 8/2016 | Huang et al. |
| 2016/0254312 A1 | 9/2016 | Lee et al. |
| 2016/0266695 A1 | 9/2016 | Bae et al. |
| 2016/0364036 A1 | 12/2016 | Deng et al. |
| 2017/0017824 A1 | 1/2017 | Smith et al. |
| 2017/0083745 A1 | 3/2017 | Goodelle et al. |
| 2017/0124370 A1 | 5/2017 | He et al. |
| 2017/0220182 A1 | 8/2017 | Schwartz et al. |
| 2017/0220838 A1 | 8/2017 | He et al. |
| 2017/0220842 A1 | 8/2017 | Thompson et al. |
| 2017/0220844 A1 | 8/2017 | Jones et al. |
| 2017/0270340 A1 | 9/2017 | Gao et al. |
| 2017/0270342 A1 | 9/2017 | He et al. |
| 2017/0337412 A1 | 11/2017 | Bhat et al. |
| 2017/0337413 A1 | 11/2017 | Bhat et al. |
| 2018/0000500 A1 | 1/2018 | He et al. |
| 2018/0075283 A1 | 3/2018 | You et al. |
| 2018/0113512 A1 | 4/2018 | Kang et al. |
| 2018/0114047 A1 | 4/2018 | Kim et al. |
| 2018/0017334 A1 | 6/2018 | Pi et al. |
| 2018/0165494 A1 | 6/2018 | Kim et al. |
| 2018/0188422 A1 | 7/2018 | Fujii et al. |

FOREIGN PATENT DOCUMENTS

| | | |
|---|---|---|
| CN | 1954776 A | 5/2007 |
| CN | 101276406 A | 10/2008 |
| CN | 101361095 A | 2/2009 |
| CN | 101416202 | 4/2009 |
| CN | 202120281 U | 1/2012 |
| CN | 102411878 A | 4/2012 |
| CN | 102419815 A | 4/2012 |
| CN | 102760017 A | 10/2012 |
| CN | 103049138 A | 4/2013 |
| CN | 103135853 A | 6/2013 |
| CN | 103458073 | 12/2013 |
| CN | 103699884 A | 4/2014 |
| CN | 103942537 | 7/2014 |
| CN | 103942537 A | 7/2014 |
| CN | 104155785 A | 11/2014 |
| CN | 104318204 A | 12/2014 |
| CN | 203982399 U | 12/2014 |
| CN | 104239869 A | 1/2015 |
| CN | 204480268 U | 7/2015 |
| CN | 204595873 U | 8/2015 |
| CN | 105094443 A | 11/2015 |
| CN | 105138171 A | 12/2015 |
| CN | 105184282 | 12/2015 |
| CN | 105205464 | 12/2015 |
| CN | 205003632 U | 1/2016 |
| CN | 107004130 | 8/2017 |
| EP | 2074946 | 7/2009 |
| EP | 3273329 A1 | 1/2018 |
| JP | 06-325158 A | 11/1994 |
| JP | 11-120324 | 4/1999 |
| JP | 2003144420 | 5/2003 |
| JP | 2009-160400 A | 7/2009 |
| JP | 2014209379 | 11/2014 |
| KR | 20030095726 | 12/2003 |
| KR | 10-2004-0042729 A | 5/2004 |
| KR | 20110095565 | 8/2011 |
| KR | 101376227 B1 | 3/2014 |
| KR | 10-1376228 B1 | 4/2014 |
| KR | 20150092964 | 8/2015 |
| KR | 20150131944 | 11/2015 |
| TW | 200905578 A | 2/2009 |
| TW | 201426563 A | 7/2014 |
| WO | 0169520 A2 | 9/2001 |
| WO | 2011110821 A1 | 9/2011 |
| WO | 2016205832 A1 | 12/2016 |
| WO | 2017/076292 A1 | 5/2017 |
| WO | 2018/049944 A1 | 3/2018 |

OTHER PUBLICATIONS

European Search Report dated Dec. 6, 2017 for European Patent Application No. 15858516.6, filed on Nov. 12, 2015 (2 pages).

International Search Report and Written Opinion dated Jan. 26, 2016 for International Application No. PCT/CN2015/094485, filed on Nov. 12, 2015 (12 pages).

Korean Office Action dated Jun. 5, 2018 for Korean Patent Application No. 10-2016-7031453, filed on Nov. 12, 2015 (9 pages).

(56) References Cited

OTHER PUBLICATIONS

Pelegris, P., et al., "A Novel Method to Detect Heart Beat Rate Using a Mobile Phone," 32nd Annual International Conference of the IEEE Engineering in Medicine and Biology, Buenos Aires, Argentina, pp. 5488-5491, Aug. 2010.
Korean Office Action dated Jan. 22, 2019 for Korean Patent Application No. 2015-80015521.7 (pp. 1-8).
European Office Action dated May 10, 2019 for EP Patent Application No. 15858516.6-1207. (pp. 1-5).
International Search Report from PCT/CN2017/095908 dated Nov. 7, 2017 (6 pages).
International Search Report from PCT/CN2018/078360 dated May 31, 2018 (4 pages).
International Search Report and Written Opinion from International Application No. PCT/US2016/038445, dated Sep. 30, 2016 (16 pages).
International Search Report from PCT/CN2017/072575 dated Apr. 1, 2017 (4 pages).
International Search Report from PCT/CN2017/083117 dated Aug. 10, 2017 (4 pages).
International Search Report from PCT/CN2018/071400 dated Mar. 29, 2018 (5 pages).
Korean Office Action from related Korean Patent Application No. 10-2017-7023032 dated Jan. 12, 2018 (9 pages). (English translation currently unavailable).
Supplementary Partial European Search Report from related European Patent Application No. 17743741 dated Nov. 8, 2018 (13 pages).
Chinese Office Action from related Chinese Patent Application No. 201780000132.6 dated Dec. 15, 2017 (6 pages). (English translation currently unavailable).
Chinese Office Action from related Chinese Patent Application No. 201780000132.6 dated Apr. 11, 2018 (10 pages). (English translation currently unavailable).
International Search Report from PCT/CN2016/104354 dated Feb. 8, 2017 (5 pages).
Korean Office Action from related Korean Patent Application No. 10-2017-7022868 dated Jan. 12, 2018 (9 pages). (English translation currently unavailable).
Supplementary European Search Report from related European Patent Application No. 16861560 dated Nov. 22, 2017 (8 pages).
Korean Office Action from related Korean Patent Application No. 10-2017-7031287 dated Feb. 14, 2018 (7 pages). (English translation currently unavailable).
Supplementary European Search Report from related European Patent Application No. 16812652 dated Mar. 19, 2018 (7 pages).
International Search Report and Written Opinion dated Sep. 29, 2018 for International Application No. PCT/CN2018/094865, filed on Jul. 6, 2018 (4 pages).
Extended European Search Report dated Apr. 1, 2019 for EP Application No. 17743741.5.
Chinese Office Action from related Chinese Patent Application No. 201580015521.7, dated Sep. 23, 2019 (pp. 1-7).
Extended European Search Report dated Aug. 27, 2019 for EP18735868.4 (12 pages).
Extended European Search Report dated Jun. 3, 2019 for EP Application No. 17809591.5 (8 pages).
Partial/Supplemental European Search Report dated Jun. 11, 2019 for EP18763421.7 (14 pages).
Partial/Supplemental European Search Report dated Jun. 5, 2019 for EP17850146.6 (14 pages).
Partial/Supplementary European Search Report dated May 20, 2019 for EP18735868.4 (14 Pages).
Chinese Office Action from related Chinese Patent Application No. 201580015521.7, dated Apr. 10, 2020 (7 pages).

\* cited by examiner

FINGERPRINT SENSORS HAVING IN-PIXEL OPTICAL SENSORS

CROSS-REFERENCES TO RELATED APPLICATIONS

This patent document claims priority and benefits to U.S. Provisional Patent Application No. 62/078,427, filed on Nov. 12, 2014, which is incorporated by reference in its entirety.

TECHNICAL FIELD

This patent document relates to fingerprint sensors.

BACKGROUND

Electronic devices including portable or mobile computing devices, such as laptops, tablets, smartphones, and gaming systems can employ user authentication mechanisms to protect personal data and prevent unauthorized access. User authentication on an electronic device can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can be unlocked by an authorized user of the device through authentication of the authorized user's fingerprint pattern.

SUMMARY

The examples of implementations described in this patent document provide fingerprint sensor designs that use optical sensors for sensing fingerprints or a combination of optical sensors and another type of fingerprint sensors such as capacitive sensors to sense fingerprints. The described fingerprint sensor designs can be used in various devices, systems or applications, and can be configured to be particularly suitable for mobile applications, and various wearable or portable devices.

In one aspect, a fingerprint sensor device for fingerprint detection includes a light source configured to emit light at a wavelength. The fingerprint sensor device includes an array of sensor pixels to acquire an optical image indicative of a fingerprint. Each sensor pixel includes a photodetector to detect the emitted light reflected off of a target finger and output an optical signal based on the detected reflected light. Each sensor pixel includes a collimator disposed over the photodetector to direct the reflected light in a substantially vertical direction from above the photodetector toward the photodetector. Each sensor pixel includes sensor signal detection circuitry communicatively coupled to the photodetector to acquire the outputted optical signal.

The fingerprint sensor can be implemented in various ways to include one or more of the following features. The photodetector can include a light emitting diode. The collimator can include a metal electrode structured to form a hole through the metal electrode. The collimator can include an optical fiber bundle. The array of sensor pixels can capacitively couple with a touched portion of a finger to form an array of fingerprint associated capacitors having capacitive values indicative of a fingerprint. Each sensor pixel can include an electrically conductive electrode that can be capacitively coupled to a local part of the touched portion of the finger, forming a fingerprint associated capacitor that outputs a capacitive signal. Each sensor pixel can include sensor switching circuitry to switch between electrically connecting the sensor signal detection circuitry to the photodetector and to the electrically conductive electrode. The sensor switching circuitry can include an integrator electrically coupled to the sensor switching circuitry to store electrical charges associated with the fingerprint associated capacitor responsive to a touch by a finger of a user. The integrator can include a reference voltage generator to generate a reference voltage. The integrator can include an amplifier that includes a positive input terminal electrically coupled to the reference voltage generator to receive the reference voltage; a negative input terminal electrically coupled to the sensor switching circuitry; and an output terminal of the amplifier. An integrating capacitor can be electrically coupled between the negative input terminal and the output terminal of the amplifier. Also, a reset switch can be electrically coupled between the negative input terminal and the output terminal of the amplifier. The reference voltage generator can vary the generated reference voltage. The reference voltage generator can include a digital to analog converter to vary the generated reference voltage. The capacitive signal associated with the fingerprint associated capacitor can represent information on a ridge or a valley of a finger.

In another aspect, a fingerprint sensor device for fingerprint identification includes an array of sensor pixel circuitry arranged to form groups of electrically connected sensor pixel circuitry operable to capture fingerprint pattern of a touched portion of a finger. Each sensor pixel circuitry in the array includes a light source to emit light at a wavelength. Each sensor pixel circuitry includes a photodetector to detect the emitted light reflected off of the touch portion of the finger. Each sensor pixel circuitry includes an electrically conductive electrode capacitively coupled to a local part of the touched portion of the finger to form a fingerprint associated capacitor. The electrically conductive electrode is disposed substantially above the photodetector and structured to form a hole through the electrically conductive electrode to substantially collimate the reflected light in a vertical direction from above the electrically conductive electrode toward the photodetector.

The fingerprint sensor device can be implemented in various ways to include one or more of the following features. Each sensor pixel circuitry in the array can include sensor switching circuitry to switch between electrically connecting sensor signal detection circuitry to the photodetector and to the electrically conductive electrode. The sensor signal detection circuitry can acquire an optical signal form the photodetector when electrically connected to the photodetector through the sensor switching circuitry and acquire a capacitive signal from the electrically conductive electrode when electrically connected to the electrically conductive electrode. The sensor signal detection circuitry can include an integrator to store electrical charges associated with the charged fingerprint associated capacitor responsive to a touch by a finger of a user. The integrator can include a reference voltage generator to generate a reference voltage. The integrator can include an amplifier that includes a positive input terminal electrically coupled to the reference voltage generator to receive the reference voltage; a negative input terminal electrically coupled to the sensor switching circuitry; and an output terminal of the amplifier. An integrating capacitor can be electrically coupled between the negative input terminal and the output terminal of the amplifier. Also, a reset switch can be electrically coupled between the negative input terminal and the output terminal of the amplifier. The fingerprint sensor device can include a control module coupled to the sensor switching circuitry in each sensor pixel circuitry. The control module can generate a control signal to control each sensor pixel circuitry in the array to integrate the output signal in each sensor pixel circuitry in the array in parallel.

In another aspect, a method performed by a fingerprint sensor device includes detecting, by an array of sensor pixel circuitry in the fingerprint sensor device, capacitance associated with a touch from a finger indicative of a fingerprint scan. The method includes detecting, by the array of sensor pixel circuitry in the fingerprint sensor device, an optical signal associated with light reflected from the finger; and outputting, by the array of sensor pixel circuitry, output signals responsive to the detected capacitance and optical signal.

The method can be implemented in various ways to include one or more of the following features. The method can include processing output signals to perform fingerprint identification. Processing the output signals can include processing the output signals to acquire an optical image of the fingerprint and a capacitive image of the fingerprint. The method can include storing the acquired optical image and capacitive image as two types of registered fingerprint images for comparing scanned fingerprints during fingerprint identification. The processing the output signals can include using the optical image to recover information on the ridges of the fingerprint in the capacitive image.

DETAILED DESCRIPTION

Fingerprint sensing is useful in mobile applications and other applications that use secure access. For example, fingerprint sensing can be used to provide secure access to a mobile device and secure financial transactions including online purchases. It is desirable to include robust and reliable fingerprint sensors features suitable for mobile devices. For example, it is desirable for fingerprint sensors in mobile devices to have a small footprint and thin to fit into the highly limited space in mobile devices; it is also desirable to include a protective cover to protect such a fingerprint sensor from various contaminants.

While there are a number of different types of fingerprint sensors, the technology described in this patent document uses capacitive and optical types. In capacitive fingerprint sensors, the sensing is based on measuring the capacitance between the sensing electrode and a finger surface due to their capacitive coupling. As the protective cover over the capacitive sensor pixels becomes thicker, the electrical field sensed by each capacitive sensor pixel disperses quickly in space leading to a steep reduction in the spatial resolution of the sensor. In connection with this e reduction of the sensing spatial resolution, the sensor signal strength received at each sensor pixel also reduces significantly with the increase in thickness of the protective cover. Thus, when the protective cover thickness exceeds a certain threshold (e.g., 300 μm), it can become more difficult for such capacitive sensors to provide a desired high spatial resolution in sensing fingerprint patterns and to reliably resolve a sensed fingerprint pattern with an acceptable fidelity. A fingerprint sensor can also be implemented by using an optical fingerprint sensor, the thickness of optical fingerprint module tend to cause the optical fingerprint sensor to be too thick, and the thickness of the optical fingerprint sensor tend to make integrating to a mobile phone device difficult.

In one aspect, the disclosed technology provides a fingerprint sensor design for an ultrathin optical fingerprint sensor for integration into a mobile device. In another aspect of the disclosed technology, a hybrid fingerprint sensor is provided to include both optical and capacitive sensors in each sensing pixel of a pixelated sensor array.

Figure 1A:
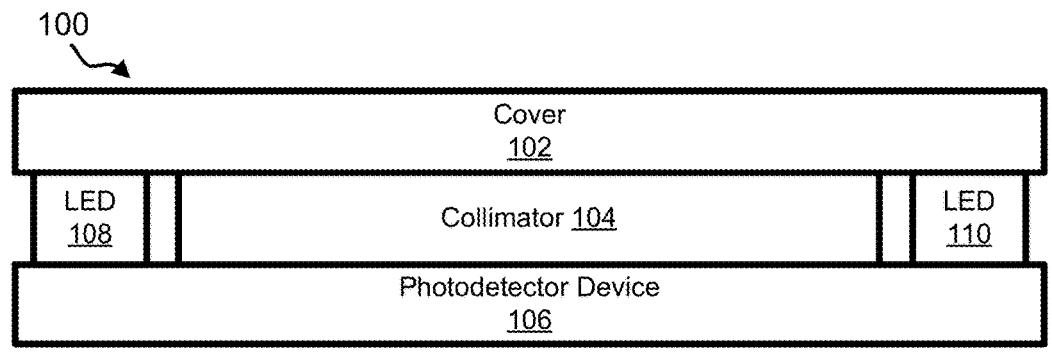
FIG. 1A is a block diagram showing an exemplary fingerprint sensor device implementing optical sensors according to the disclosed technology.

FIG. 1A is a block diagram showing an exemplary fingerprint sensor device 100 implementing optical sensors according to the disclosed technology. The hardware structure of the exemplary fingerprint sensor device 100 as shown as in FIG. 1A can be structured to provide an ultrathin fingerprint sensor, desirable for fingerprint sensing in mobile devices or other wearable or portable devices. The fingerprint sensor device 100 includes an optical sensing device or a photodetector device 106 to detect light reflected, scattered or diffused from a finger under illumination by light that is emitted from one or more light sources such as light emitting diodes (LEDs) 108 and 110 built into the fingerprint sensor device 100. The photodetector device 106 can be implemented to include a photodetector array of optical detectors as optical sensing pixels with associated signal processing circuitry. Each optical sensing pixel may include one or more photodetectors, such as a photodiode. The photodetector array 106 can be implemented in various sizes depending on the needed size of the active fingerprint sensing area, e.g., 96×96, 72×128, or 96×192 arrays in some applications. An optical collimator layer 104 is disposed over the photodetector device 106 and structured to collect and collimate or focus received light (including received light in the vertical direction) onto photodetectors of the underlying photodetector device 106. In implementations, this optical collimator layer 104 may include an array of individual collimators that respectively correspond to the photodetectors in the photodetector array 106, one collimator per photodetector. In the illustrated example, LED light sources 108 and 110 are placed in the same layer with the collimator layer 104 and are located in the peripheral region of the photodetectors of the photodetector device 106. A cover 102, that includes a hard material (e.g., sapphire and others) that at least partially transmits light, is disposed over the collimator layer 104 and the LED light sources 108 and 110. The cover 102 can be integrated with the fingerprint sensor device 100 when the fingerprint sensor device 100 is mounted on a mobile device and flushes against or levels with the cover of the mobile device or next to the cover of the mobile device. In devices where the fingerprint sensor device 100 is mounted under the cover of the mobile device, the cover 102 of the ultra-thin fingerprint sensor device 100 may not be necessary and thus may be eliminated.

The light sources 108 and 110 are positioned to illuminate a finger located above or in contact with the fingerprint sensor device 100 so that reflected, scattered or diffused light by the finger can be collected by the collimator layer 104 and detected by the photodetector device 106. The number of light sources included in the fingerprint sensor device 100 can vary and may be determined based on the amount of light desired to perform optical sensing with a desired detection sensitivity or image resolution, for example. The LED light sources 108 and 110 can be disposed to surround the collimators and emit light toward the an object (e.g., a finger) touching or placed over the cover 102. The emitted light is directed back toward the fingerprint sensor device 100 after being reflected off the object. The collimator layer 104 is disposed and structured to focus the light in the vertical direction (e.g., the light reflected off the object) and substantially block light from other directions including the light emitted directly toward the photodiode array 106 from the LED light sources 108 and 110 in the horizontal direction, near the horizontal direction or directions that form large angles with the vertical direction.

Figure 1B:
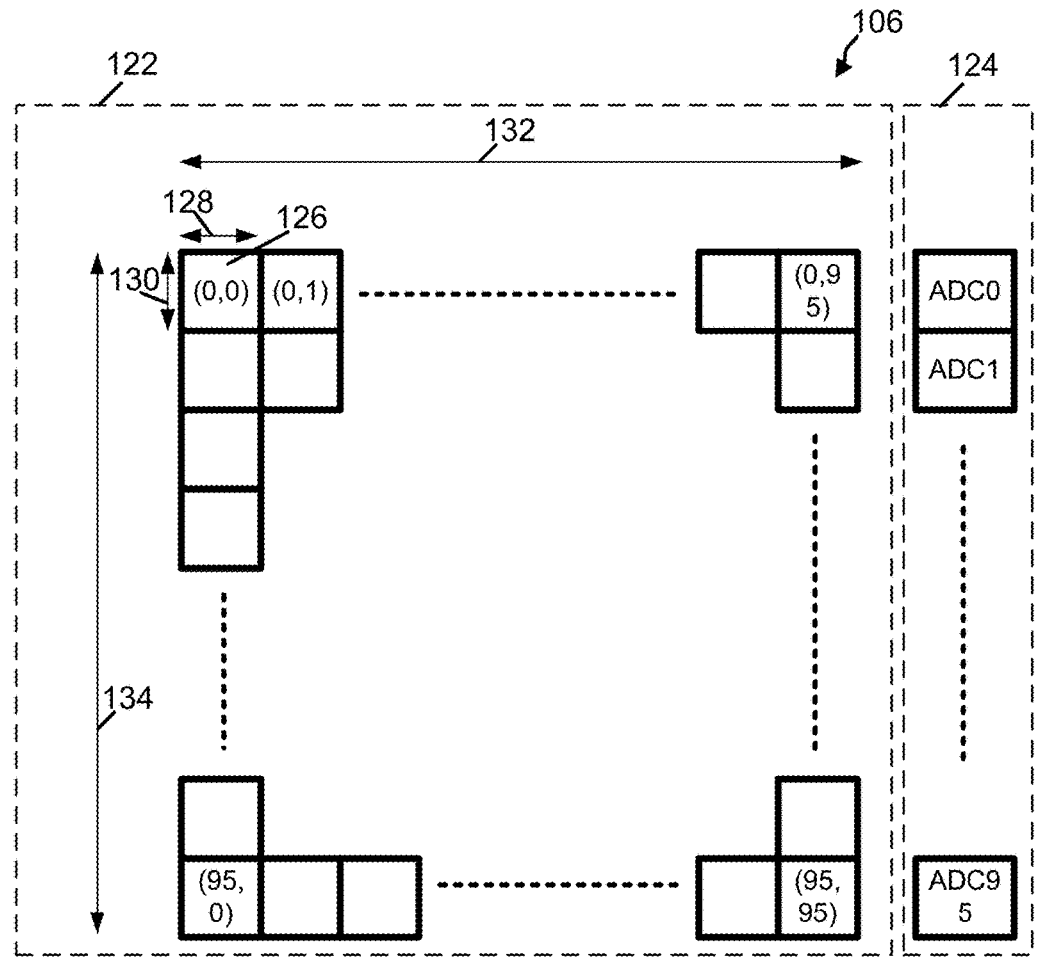
FIG. 1B is a block diagram showing an exemplary layout of the photodetector device.

FIG. 1B is a block diagram showing an exemplary layout of the photodetector device 106 illustrating, e.g., individual photodetectors or photosensing pixels. The particular example shown in FIG. 1B represents a 96×96 photodiode array 122 with associated signal processing circuitry 124, such as a column of analog-to-digital converters (ADCs) 124. In addition, a sensor device processor is coupled to the ADCs 124 and processes the pixel output signals from optical sensing pixels to extract the fingerprint information. A given row of photodiode sensors in the array 122 can be associated with and in communication with one of the ADCs 124. An exemplary dimension of a given photodiode 126 in the array 122 can be as small as possible for mobile device application, such as 50 µm long (128) by 50 µm wide (130). For the array 122 of 50 µm×50 µm photodiodes, the width of the array 122 can be 50 µm×96 photodiodes=4.8 mm=0.189 inch=~500 parts per inch (ppi). Similarly, the length or depth of the array 122 can be 50 µm×96 photodiodes=4.8 mm=0.189 inch=~500 ppi.

Figure 2:
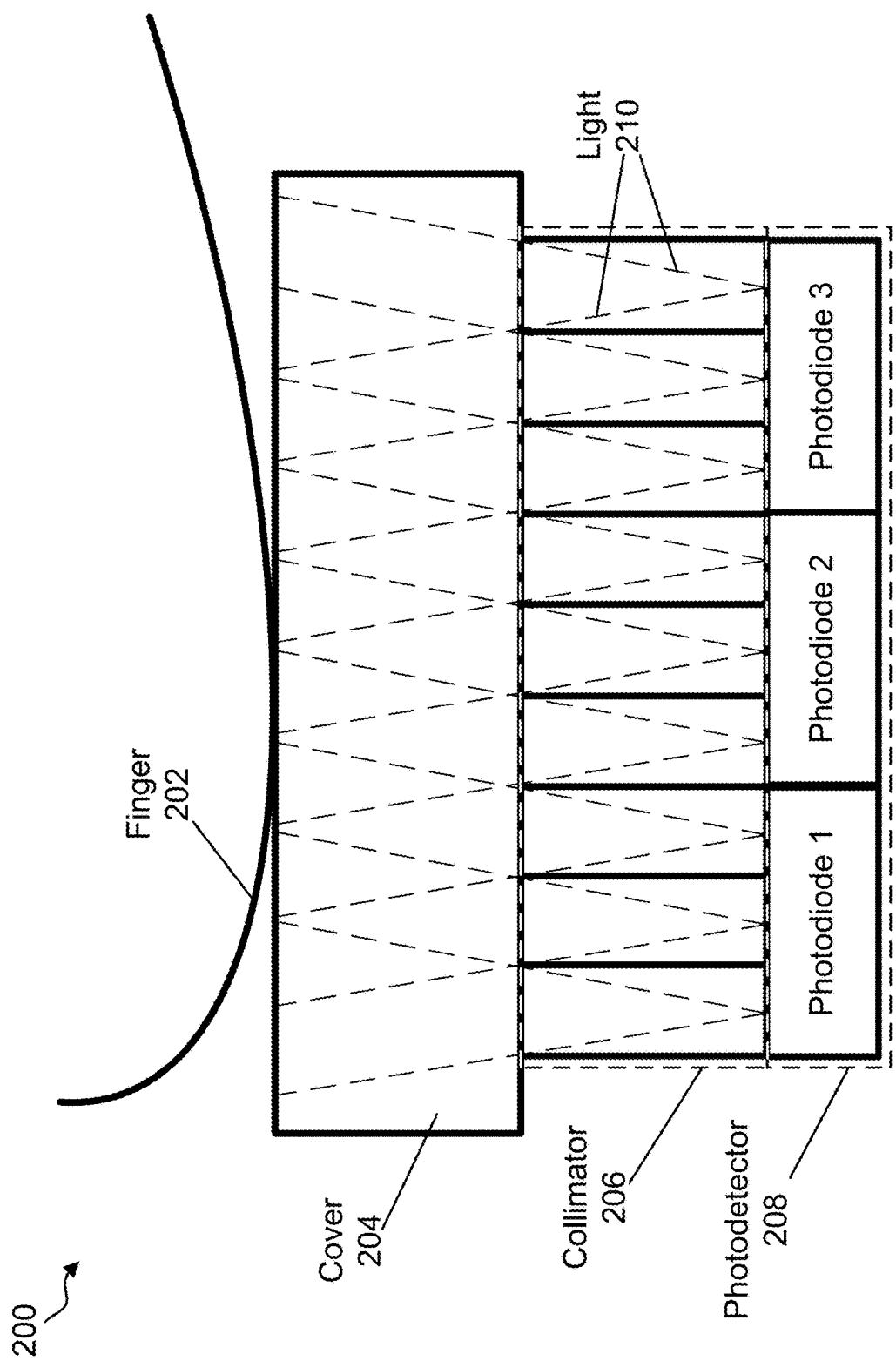
FIG. 2 is a block diagram showing an exemplary fingerprint sensor device with a collimator implemented using a fiber bundle.

The collimator layer 104 can be implemented using various structures to focus the light incident on the photodetector in a desired direction, such as the vertical direction. FIG. 2 is a block diagram showing an exemplary fingerprint sensor device 200 with a collimator layer 104 that is implemented by using fiber bundles. Similar to the fingerprint sensor device 100 shown in FIG. 1A, the fingerprint sensor device 200 includes an array of photodetectors 208 (e.g., photodiodes) and a collimator layer including an array of collimators 206 disposed over the photodetectors 208 to direct light 210 toward the photodetectors 208 in a desired direction (e.g., at or near the vertical direction), and an optional cover 204 disposed over the collimators 206. In this particular example in FIG. 2, for each photodetector 208, one fiber bundle of fibers is used as the collimator 206 to use the top end facets of the fibers in the bundle to collect incident light and use the fibers in the bundle to guide or direct the collected light 210 to the corresponding underlying photodetector 208. Accordingly, multiple bundles of fibers form the collimator array in this example.

While not shown in FIG. 2, one or more light sources are disposed around the collimator to provide adequate light for the photodetector 208 to detect and perform optical sensing of fingerprint images. The photodetector 208 can include one or more photodiodes to detect light emitted by the one or more light sources after being reflected off of an object 202, such as a finger. In the example shown in FIG. 2, the collimator 206 is implemented using an optical fiber bundle disposed in the vertical direction to narrow or focus the transmission of reflected light 210 along the optical fiber bundle in the vertical direction toward the photodetector 208. Other collimator designs may also be implemented.

Figure 3A:
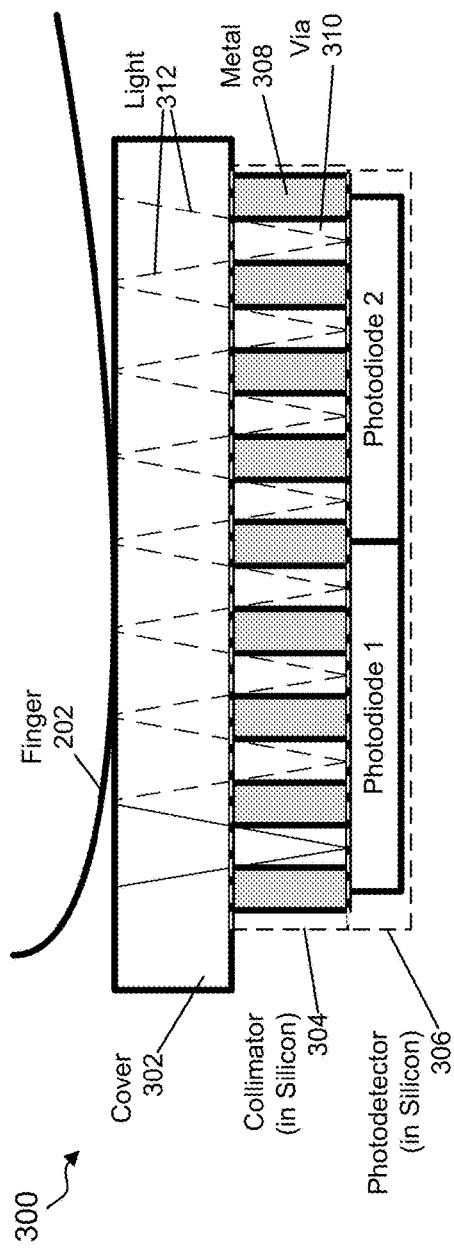
FIGS. 3A and 3B show another exemplary fingerprint sensor device with a collimator implemented using a metal layer with holes or openings to narrow or focus transmission of light toward a photodetector.
Figure 3B:
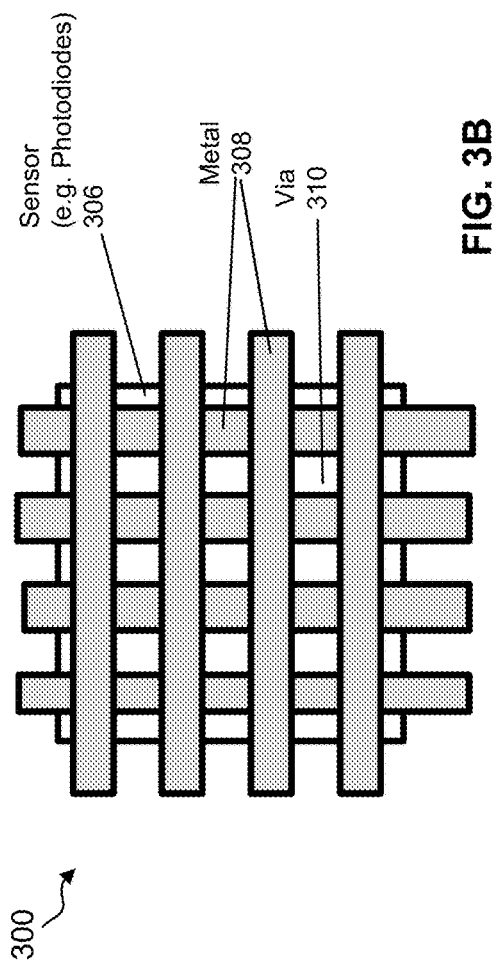

FIGS. 3A and 3B show another exemplary fingerprint sensor device 300 with a collimator implemented using a metal layer with holes or openings to narrow or focus transmission of light toward a photodetector. Similar to the fingerprint sensor devices 100 and 200 shown in FIGS. 1A and 2, the fingerprint sensor device 300 includes a photodetector array of photodetectors 306 and a collimator array of collimators 304 disposed over the photodetector 306 to direct light 312 toward the photodetectors 306 in a desired direction (e.g., vertical direction), and an optional cover 302 disposed over the collimators 304. While not shown in FIG. 2, one or more light sources are disposed around the collimator 304 to provide adequate light for the photodetector 306 to detect and perform optical sensing of fingerprint images. In implementations, each photodetector 306 can include one or more photodiodes to detect light emitted by the one or more light sources after being reflected off an object 202, such as a finger. In the example shown in FIGS. 3A and 3B, the collimators 304 are implemented using one or more metal layers 308 structured to form holes or openings 310 in the one or more metal layers 308 to narrow or focus the transmission of reflected light 312 toward the photodetector 306 in the vertical direction through the holes or openings 310. As illustrated in FIGS. 3A and 3B, two or more holes or openings 310, which are labeled as "vias," form a collimator for each photodetector.

In some implementations, the collimators 304 with metal holes or openings 310 can be implemented by disposing one or more metal layers in silicon, for example, by building up metal walls separated from each other to form a collimator. FIG. 3B is a top-down view of the fingerprint sensor device 300 showing the metal layer(s) with holes or openings 310 formed by the metal walls.

Referring to FIGS. 2, 3A and 3B, the optical fiber bundle in collimator 206 and the holes or openings 310 in the metal layer(s) of collimator 304 may have a relatively small Numerical Aperture (NA) in receiving input light, the fingerprint image of the finger placed on or over the protective cover 204 and 302 can be accurately preserved or captured by the photodetector 208 or 306 even when the protective cover 204 and 302 is thick. The collimators 206 and 304 are structured to enable acquisition of a target image through a thick protective cover (e.g., an optional cover integrated with the fingerprint sensor device or a cover on a mobile device) without a large reduction in image contrast and image spatial resolution. In both FIGS. 2 and 3A and 3B, the covers 204 and 302 can be implemented using glass or other dielectric material that at least partially transmits light through the covers 204 and 302.

Figure 4A:
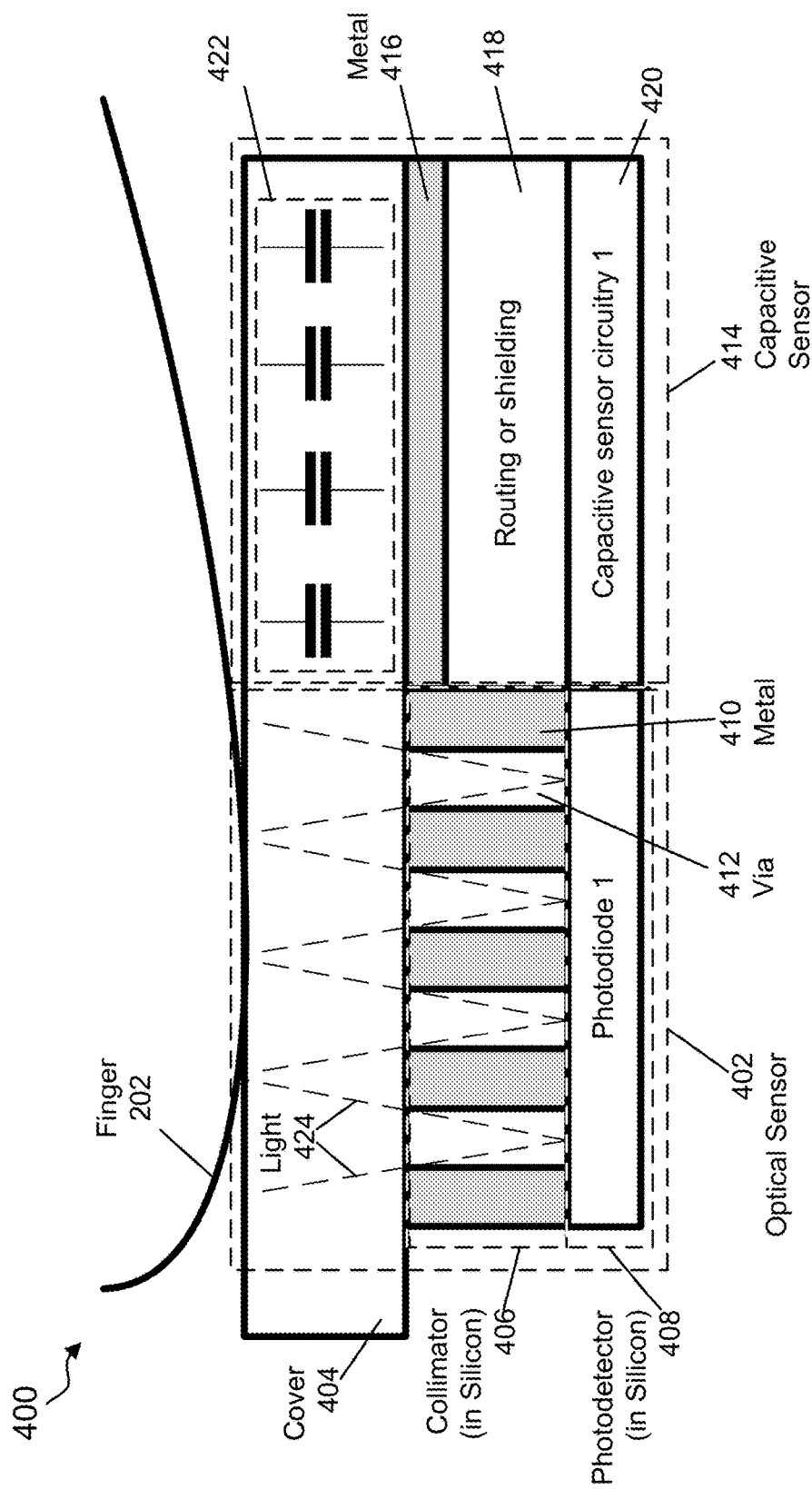
FIG. 4A shows an exemplary fingerprint sensor device implemented to incorporate a capacitive sensor in addition to an optical sensor for each sensor pixel.
Figure 4B:
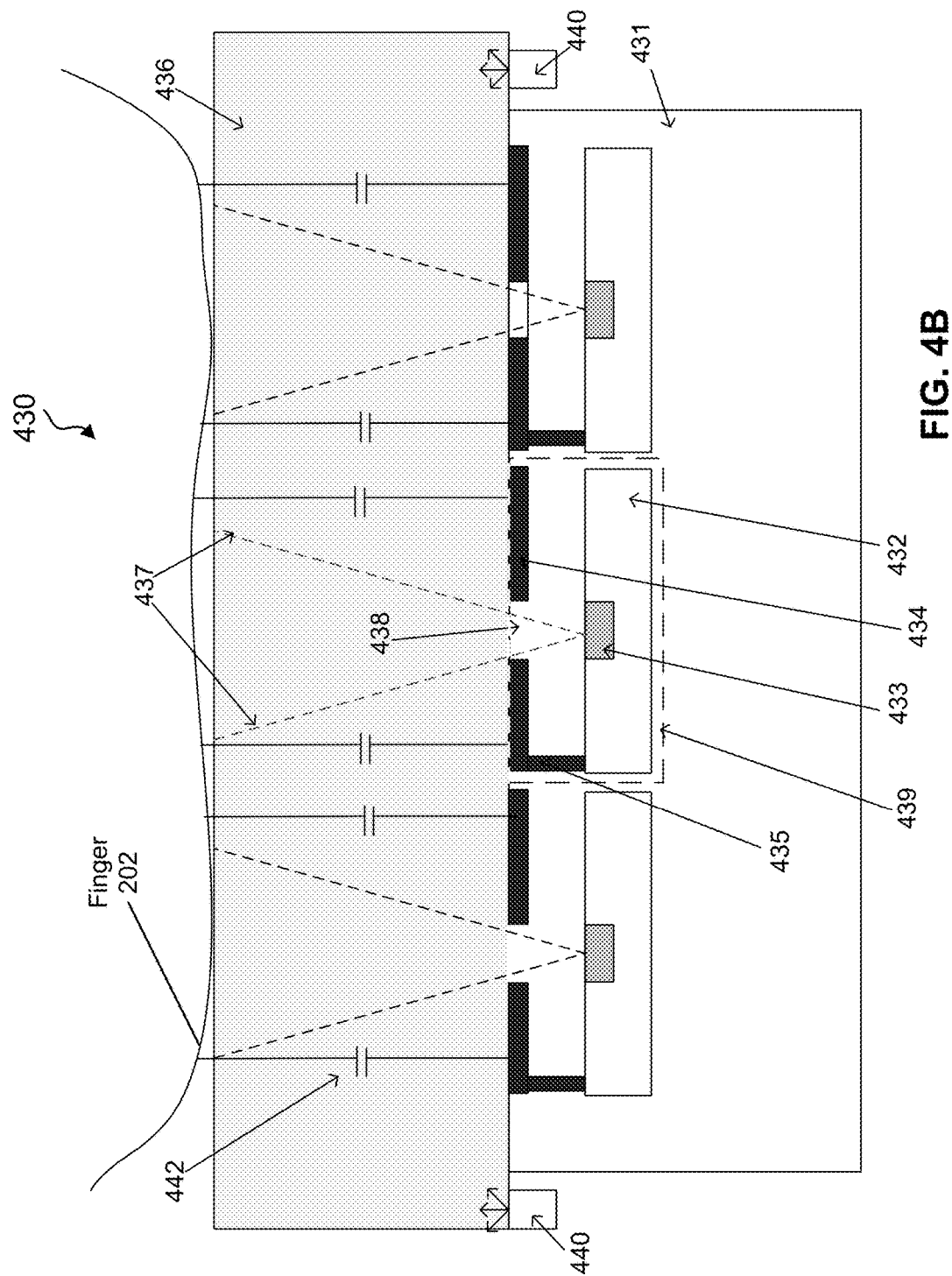
FIG. 4B illustrates an exemplary fingerprint sensor device that structurally integrates an optical sensor with a capacitive sensor in each sensor pixel in an array of sensor pixels.

In another aspect of the disclosed technology, each sensing pixel of a fingerprint sensor device can be a hybrid sensing pixel having a capacitive sensor for capturing fingerprint information and an optical sensor for capturing fingerprint information. FIGS. 4A and 4B show two examples of hybrid sensing pixel designs.

FIG. 4A shows an example of a fingerprint sensor device 400 that incorporates a capacitive sensor in addition to an optical sensor for each sensor pixel in capturing fingerprint information. By combining both capacitive sensors and optical sensors, fingerprint images obtained with the optical sensors can be used to better resolve the 3D fingerprint structure obtained with the capacitive sensors. For illustrative purposes, the structure shown in FIG. 4A represents one sensor pixel in an array of sensor pixels and each sensor pixel includes an optical sensor 402 and a capacitive sensor 414 that are disposed next to each other within the same pixel.

The optical sensor 402 includes a photodetector 408 and a collimator 406 disposed over the photodetector 408 to narrow or focus reflected light 424 from finger 202 toward the photodetector 408. One or more light sources, such as LEDs (not shown) can be disposed around the collimator 406 to emit light, which is reflected off the finger as reflected light 424 and is directed or focused toward the corresponding photodetector 408 to capture a part of the fingerprint image of the finger 202. The collimator 406 can be implemented using an optical fiber bundle as shown in FIG. 2 or one or more metal layer(s) 308 with holes or openings 310 as shown in FIGS. 3A and 3B. FIG. 4A shows the collimator 406 implemented using one or more metal layers 410 with holes or openings 412.

In the capacitive sensing part of each sensing pixel, the capacitive sensor 414 includes a capacitive sensor plate 416 that is electromagnetically coupled to a portion of a finger that is either nearby or in contact with the sensing pixel to perform the capacitive sensing. More specifically, the capacitive sensor plate 416 and the finger 202 interact as two plates of one or more capacitive elements 422 when the finger 202 is in contact with or substantially near the optional cover 404 or a cover on a mobile device that implements the fingerprint sensor device 400. The number of capacitive sensor plates 416 can vary based on the design of the capacitive sensor 414. The capacitive sensor plate 416 can be implemented using one or more metal layers. The capacitive sensor plate 416 is communicatively coupled to capacitive sensor circuitry 420 so that the capacitive sensor circuitry 420 can process the signals from the capacitive sensor plate 416 to obtain data representing the 3D fingerprint structure. A routing or shielding material can be disposed between the capacitive sensor plate 416 and the capacitive sensor circuitry to electrically shield the metal plate 416. The capacitive sensor circuitry 420 can be communicatively coupled to both the capacitive sensor plate 416 and the photodetector 408 to process both the signal from the capacitive sensor plate 416 and the signal from the photodetector 408.

In FIG. 4A, the capacitive sensor and the optical sensor within each hybrid sensing pixel are adjacent to and displaced from each other without being spatially overlapped. FIG. 4B illustrates another example of a fingerprint sensor device 430 that structurally integrates an optical sensor and a capacitive sensor in each hybrid sensor pixel in a spatially overlap configuration in an array of sensor pixels to reduce the footprint of each hybrid sensing pixel. The fingerprint sensor device 430 includes a semiconductor substrate 431, such as silicon. Over the substrate 431, multiple sensing elements or sensing pixels 439 are disposed. Each sensing element or sensing pixel 439 includes active electronics circuitry area 432 including CMOS switches, amplifier, resistors and capacitors for processing sensor signals. Each sensing pixel or sensing element 439 includes a photodetector 433 disposed or embedded in the active electronics circuitry area 432. A capacitive sensor plate or a top electrode 434 of the capacitive sensor for capacitive sensing is disposed over a photodetector 433 and includes a hole or opening 438 on the sensor plate 434 to function also as a collimator of light for directing light onto the photodetector 433. A via 435 filled with conductive material is disposed to electrically connect the top electrode 434 to the active circuit elements 432. By adjusting the opening or the hole and the distance of the top electrode 434 with the photodetector 433, the light collecting angle 437 of the photodetector (e.g., photodiode) 433 can be adjusted. The fingerprint sensor device 430 is covered by a protective cover 436, which includes hard materials, such as sapphire, glass etc. Photodetector 433 light collection angle 437 can be designed to preserve the spatial resolution of the image collected by the photodiode arrays. A light source 440, such as an LED, is placed under the cover, on the side of fingerprint sensor device 430 to emit light, which is reflected off the finger and directed toward the photodetector 433 to capture the fingerprint image. When a finger touches or comes substantially near the protective cover, the finger and the sensing top electrode 434 in combination form a capacitive coupling (e.g., capacitor 442) between the human body and sensing top electrode 434. The fingerprint sensor device 430 that includes both optical and capacitive sensors can acquire images of both a light reflection image of fingerprint and also a capacitive coupling image. The sensing top electrode 434 serves dual purpose: 1) for capacitive sensing, and 2) as a collimator (by fabricating one or more holes on the sensing top electrode 434) to direct, narrow or focus reflected light from the finger toward the photodetector 433. Reusing the sensing top electrode 434 eliminates the need for additional metal layer or optical fiber bundle, and thus reduces each pixel size and accordingly the overall size of the fingerprint sensor device 430.

Figure 5:
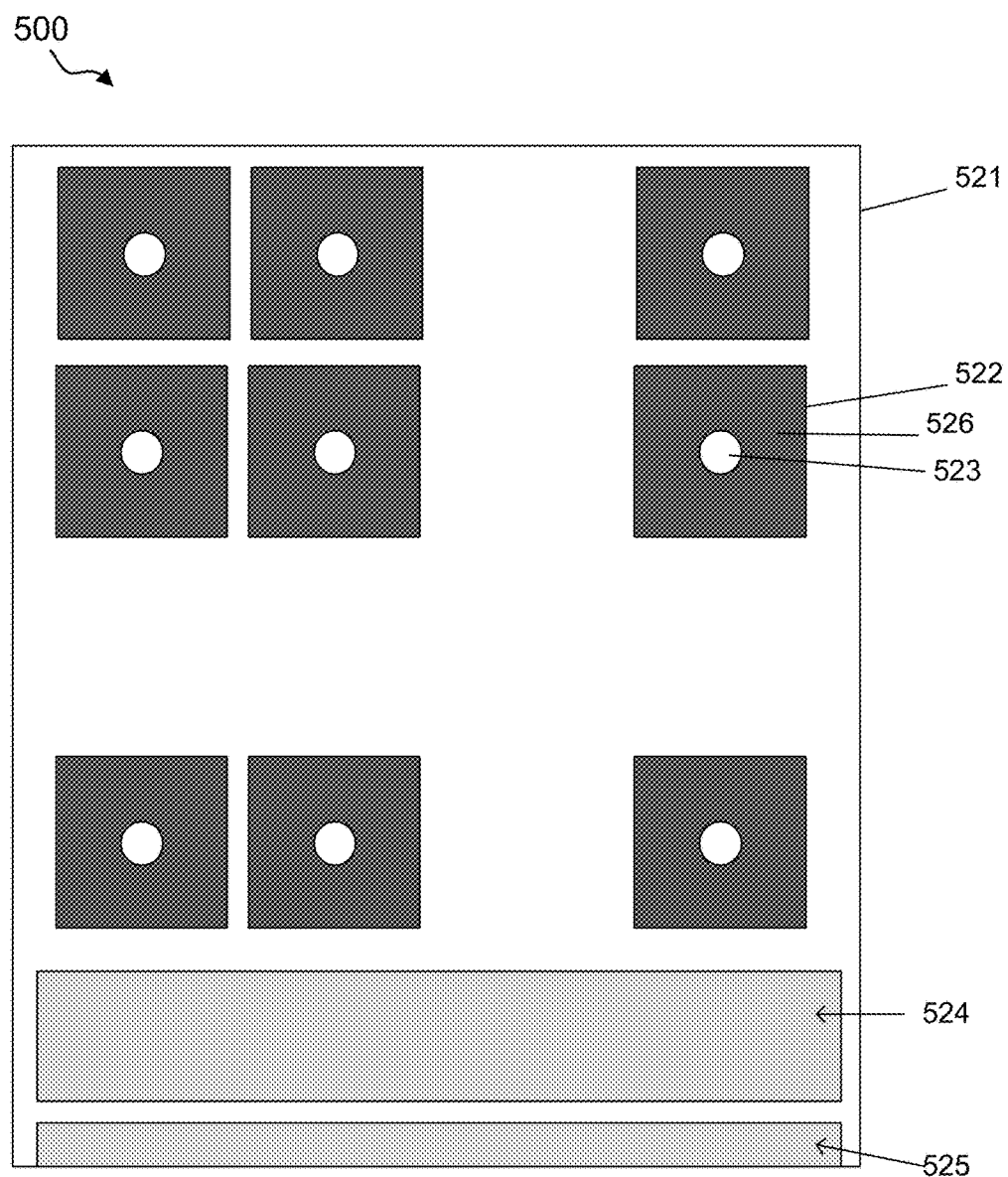
FIG. 5 is a top-down view of an exemplary hybrid fingerprint sensor device incorporating both an optical sensor and a capacitive sensor.

FIG. 5 is a top-down view of an exemplary hybrid fingerprint sensor device 500 incorporating both an optical sensor and a capacitive sensor in each hybrid sensing pixel. The fingerprint sensor device 500 is implemented as a CMOS silicon chip 521 that includes an array of hybrid (incorporating both an optical sensor and a capacitive sensor) sensing elements or pixels 522. The size or dimension of the sensing elements can be in the range of 25 μm to 250 μm, for example. The hybrid sensor device 500 can include an array of support circuitry including amplifiers, ADCs, and buffer memory in a side region 524. In addition, the hybrid sensor device 500 can include an area for wire bonding or bump bonding 525. A top layer 526 of the hybrid sensor element 522 can include a metal electrode for capacitive sensing. One or more openings or holes 523 can be fabricated on each top metal electrode 23 to structurally serve as a collimator for directing light in a vertical direction to shine on a photodetector under the top electrode. Thus, the top layer 526 structure can serve dual purposes of optical and capacitive sensing. A sensor device processor can be provided to process the pixel output signals from hybrid sensing pixels to extract the fingerprint information.

In addition to sharing the same structure for capacitive sensing and for focusing light in the vertical direction as a collimator, one instance of sensor signal detection circuitry can be shared between the optical and capacitive sensors to detect the sensor signals from both a photodetector and a capacitive sensor plate.

Figure 6A:
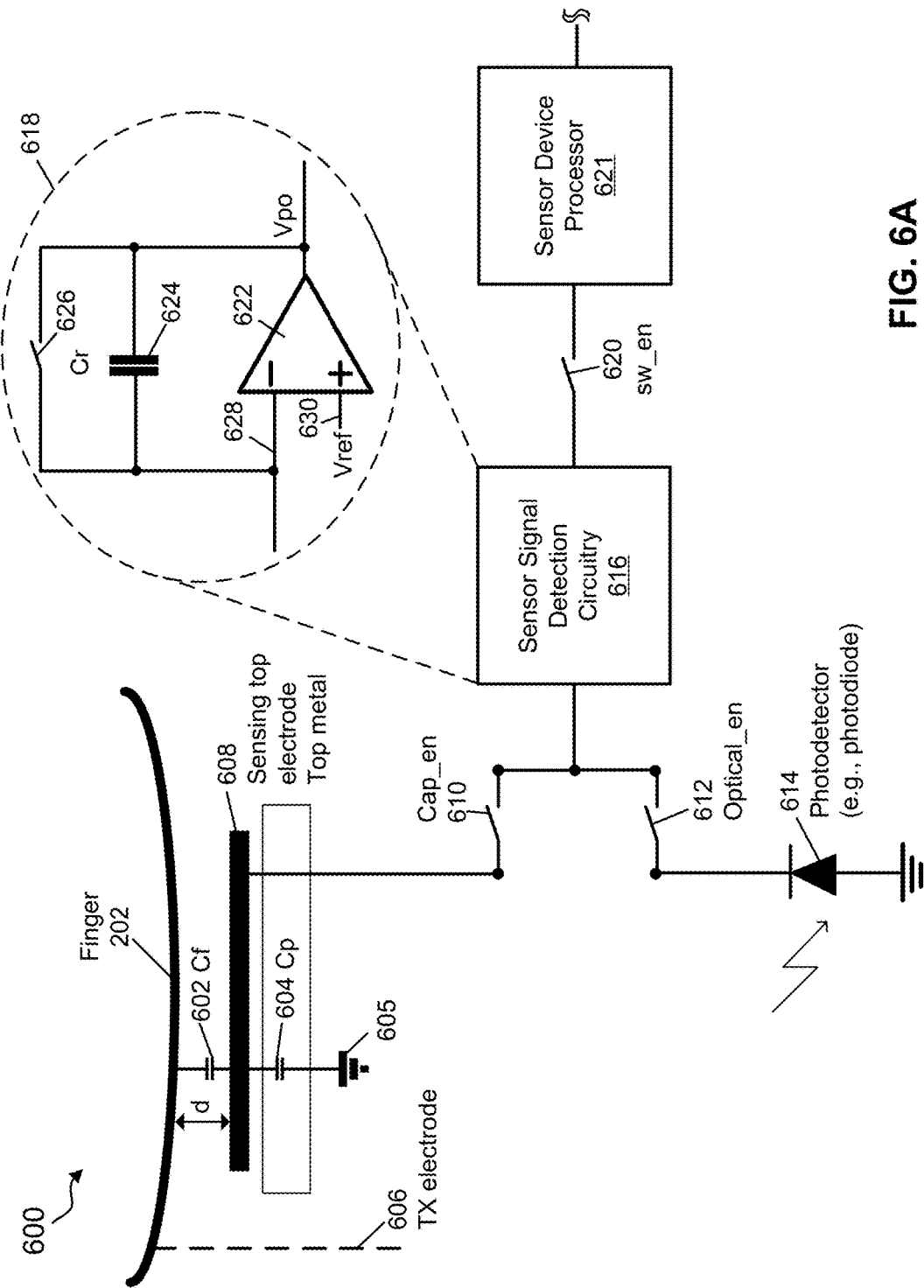
FIG. 6A illustrates a circuit diagram for an exemplary hybrid fingerprint sensing element or pixel.

FIG. 6A illustrates a circuit diagram for an exemplary hybrid fingerprint sensing element or pixel 600 having both capacitive sensing and optical sensing functions for fingerprints. The exemplary sensor pixel 600 includes sensor signal detection circuitry 616 to selectively switch between detecting or acquiring sensor signals from a sensing top electrode (e.g., a top metal layer) 608 based on capacitive sensing and a photodetector (e.g., a photodiode) 614 based on optical sensing to acquire both a reflective optical image from the photodetector 614 and a capacitive coupled image from the capacitive sensor electrode 608 from a finger. In some implementations, such as the one specifically illustrated in FIG. 6A, the two images from the two sensing mechanisms in each hybrid sensing pixel can be serially processed by the sensor signal detection circuitry 611. In the illustrated example, switches 610 and 612 have first terminals that are electrically coupled to the sensing top electrode 608 and the photodetector 614, respectively, and second terminals that are coupled to a common input terminal of the sensor signal detection circuitry 616 to provide corresponding the optical detector signal from the photodetector 614 and the capacitive sensing signal from the sensing top electrode 608 to the sensor signal detection circuitry 616. When the switch 610 is turned off (CAP_EN=0) and the switch 612 is turned on (Optical_en=1), the sensor signal detection circuitry 616 acquires the optical detector signal representing the optical image of the scanned fingerprint received at the particular hybrid sensing pixel. The sensor signal detection circuitry 616 can acquire the capacitive sensing signal representing the capacitive image of the scanned fingerprint when switch 610 CAP_EN=1 and Optical_en=0. After both the optical and capacitive images are acquired, both images can be processed in downstream circuitry separately and in combination to identify the fingerprint characteristics.

With the two modality of imaging by the above hybrid sensing pixels, the performance of the fingerprint identification can be enhanced by making use of the two types of the images in different ways. This enhanced fingerprint identification can be achieved by the sensor device processor, such as sensor device processor 621, for processing the pixel output signals from the hybrid sensing pixels to extract the fingerprint information. For example, the capacitive image can provide a 3D image on the depth of the ridges and valleys of the fingerprint features. Complementing the 3D capacitive image, the optical image can provide a high resolution 2D information on the fingerprint characteristics. The optical 2D image having a higher spatial resolution can be used to recover the capacitive sensing image resolution because both images information on the same ridges of the fingerprint. In some implementations where the capacitive sensing method may be more sensitive and accurate on identifying the valleys of the fingerprint than the optical sensing method, the spatial resolution of images acquired using the capacitive sensing method can degrade based on the thickness of the cover. This aspect of the capacitive sensing can be supplemented by the optical sensing. In operation, the sensor response may be fixed and the point spread function of the capacitive sensor may be fixed for all sensor positions. The higher resolution optical sensing can be used as a resolution recover method and can be applied on the capacitive sensing image to enhance the 3D image. A partial high resolution image from optical sensing can be available to help with the recovering method. Thus, the 3D capacitive image can be enhanced to provide more information on the valleys and ridges by interpolating or recovering based on the high resolution 2D image.

The enhanced 3D image can provide an improved fingerprint recognition and matching. In another example, the optical and capacitive images can be stored together to provide two comparisons each time a fingerprint recognition or matching is performed. The use of two types of images for comparison enhances the accuracy and security of the fingerprint sensing system.

The sensor signal detection circuitry 616 can be implemented in various ways using a number different circuitry designs. In one example, integrator sensing circuitry 618 can be implemented to store the electric charges caused by ridges and valleys touching or being substantially near the cover of the fingerprint sensor device of the cover of the mobile device.

The inclusion of the integrator circuitry 618 enhances the signal-to-noise ratio (SNR). The integrator sensing circuitry includes an operational amplifier 622 to amplify a sensor signal, such as a capacitance related or optical related signal (e.g., voltage signal), detected by the sensing top electrode 608 or the photodetector 614 of the exemplary sensor pixel 600. The sensing top electrode 608 that include a conductive material, such as one of a variety of metals is electrically connected to a negative or inverting terminal 628 of the amplifier 622 through the switch 610. The sensing top electrode 608 and a local surface of the finger 202 function as opposing plates of a capacitor Cf 602. The capacitance of the capacitor Cf 602 varies based on a distance 'd' between the local surface of the finger 202 and the sensing top electrode 608, the distance between the two plates of the capacitor Cf 602. The capacitance of capacitor Cf 602 is inversely proportional to the distance 'd' between the two plates of the capacitor Cf 602. The capacitance of capacitor Cf 602 is larger when the sensing top electrode 608 is opposite a ridge of the finger 202 than when opposite a valley of the finger 202.

In addition, various parasitic or other capacitors can be formed between different conductive elements in the exemplary sensor pixel 600. For example, a parasitic capacitor CP 604 can form between the sensing top electrode 608 and a device ground terminal 605. Device ground is coupled to earth ground closely. Another capacitor Cr 624 can form between an output conductor of the amplifier 622 and the negative or inverting terminal 628 of the amplifier 622 and functions as a feedback capacitor to the amplifier 622. Also, a switch 626 can be coupled between the output of the amplifier 622 and the negative or inverting terminal 628 of the amplifier 622 to reset the integrator circuitry 618.

The positive terminal of the amplifier 622 is electrically connected to an excitation signal Vref. The excitation signal Vref can be directly provided to the positive terminal of a dedicated amplifier in each sensor pixel. By providing the excitation signal Vref directly to the positive terminal of the amplifier 622, the exemplary sensor pixel 600 becomes an active sensor pixel. In addition, providing the excitation signal Vref directly to the positive terminal of the amplifier 622 eliminates the need to include an excitation electrode, common to all sensor pixels, which reduces a conductive (e.g., metal) layer from the semiconductor structure of the sensor chip. In some implementations, an optional excitation electrode 606 can be implemented to enhance the SNR based on the design of the sensor pixel. In addition, by providing the excitation signal Vref 630 directly to the amplifier 622, the excitation signal Vref 622 is not applied directly to the finger 202 to avoid potentially irritating or injuring the finger 202. Moreover, when the excitation electrode for applying the excitation signal directly to the finger is not used, all components of the fingerprint sensor device can be integrated into a single packaged device, and the entire fingerprint sensor device can be disposed under the protective cover glass. With the entire fingerprint sensor device disposed under the protective cover glass, the fingerprint sensor device is protected from the finger and other external elements that can potentially damage the fingerprint sensor.

In FIG. 6A, the output signal (optical and capacitive) of the sensor signal detection circuitry 616 (e.g., Vpo of the amplifiers 622) in the sensor pixels 600 is electrically coupled to a switch 620 to selectively output the output signal Vpo from the sensor pixel 600 to a signal processing circuity including a filter. The switch 620 can be implemented using a transistor or other switching mechanisms and electrically coupled to a controller to control the switching of the switch 620. By controlling the switches 620, 610 and 612, the sensor pixels in an array of sensor pixels can be selectively switched between acquiring the optical signals and the capacitive signals. In one implementation, the optical or capacitive signal can be acquired for each line, row or column of sensor pixels in the array and then switched to acquire the other type of signal for the line, row or column. The switching between the optical and capacitive signal acquisition can be performed line-by-line. In another implementation, one type of signal (capacitive or optical) can be acquired for all sensor pixels or elements in the array and then switched to acquire the other type of signal for all of the sensor pixels or elements. Thus, the switching between acquisition of different signal types can occur for the entire array. Other variations of switching between acquisition of the two types of sensor signals can be implemented.

Figure 6B:
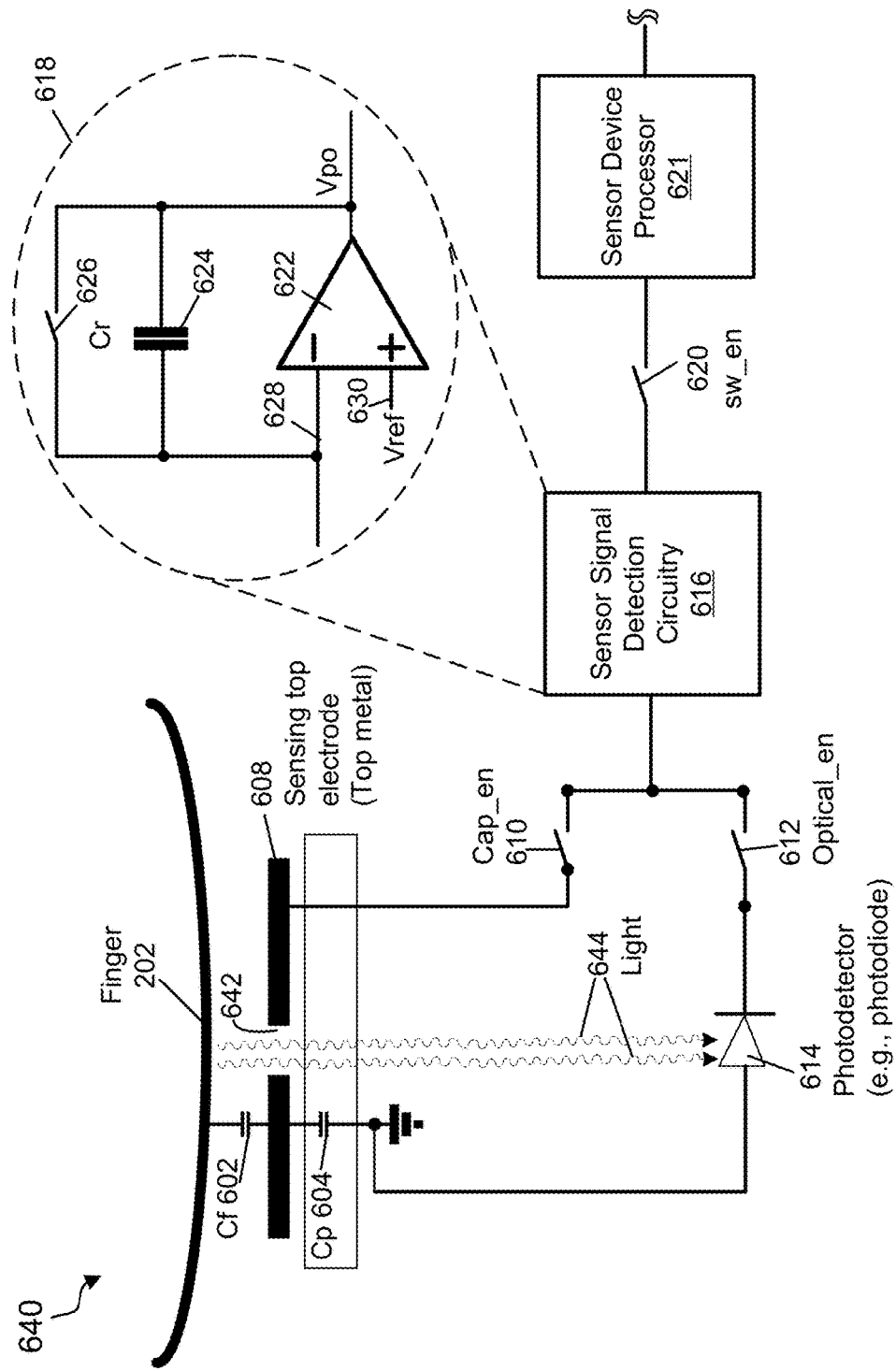
FIG. 6B illustrates a circuit diagram for another exemplary hybrid fingerprint sensing element or pixel.

FIG. 6B illustrates a circuit diagram for another exemplary hybrid fingerprint sensing element or pixel 640. The hybrid fingerprint sensing element or pixel 640 is substantially the same as the hybrid fingerprint sensing element or pixel 600 with respect to the components having the same reference number. For descriptions of the common components having the same reference number, refer to the description of FIG. 6A.

The hybrid fingerprint sensing element or pixel 640 implements the sensing top electrode 608 to include a hole or opening 642 that functions as a collimator to focus or narrow the reflected light 644 toward the photodetector 614 (e.g., photodiode). The photodetector 614 can be positioned or disposed below the collimator implemented using the sensing top electrode 608 to capture the reflected light 644 focused by the collimator 608.

Figure 6C:
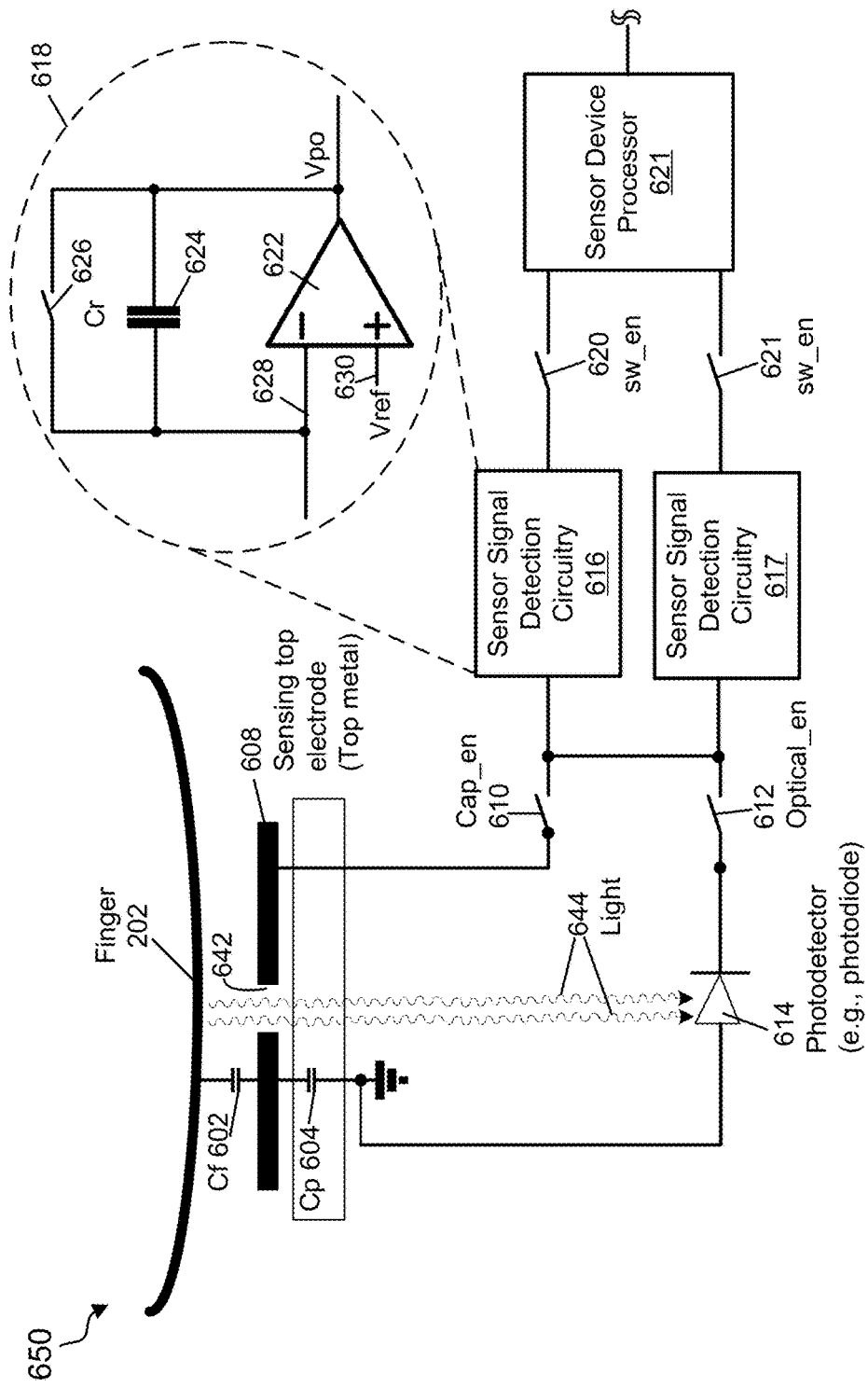
FIG. 6C illustrates a circuit diagram of an exemplary hybrid fingerprint sensing element or pixel for performing parallel detection of sensor signals from a hybrid fingerprint sensing element or pixel.
Figure 7A:
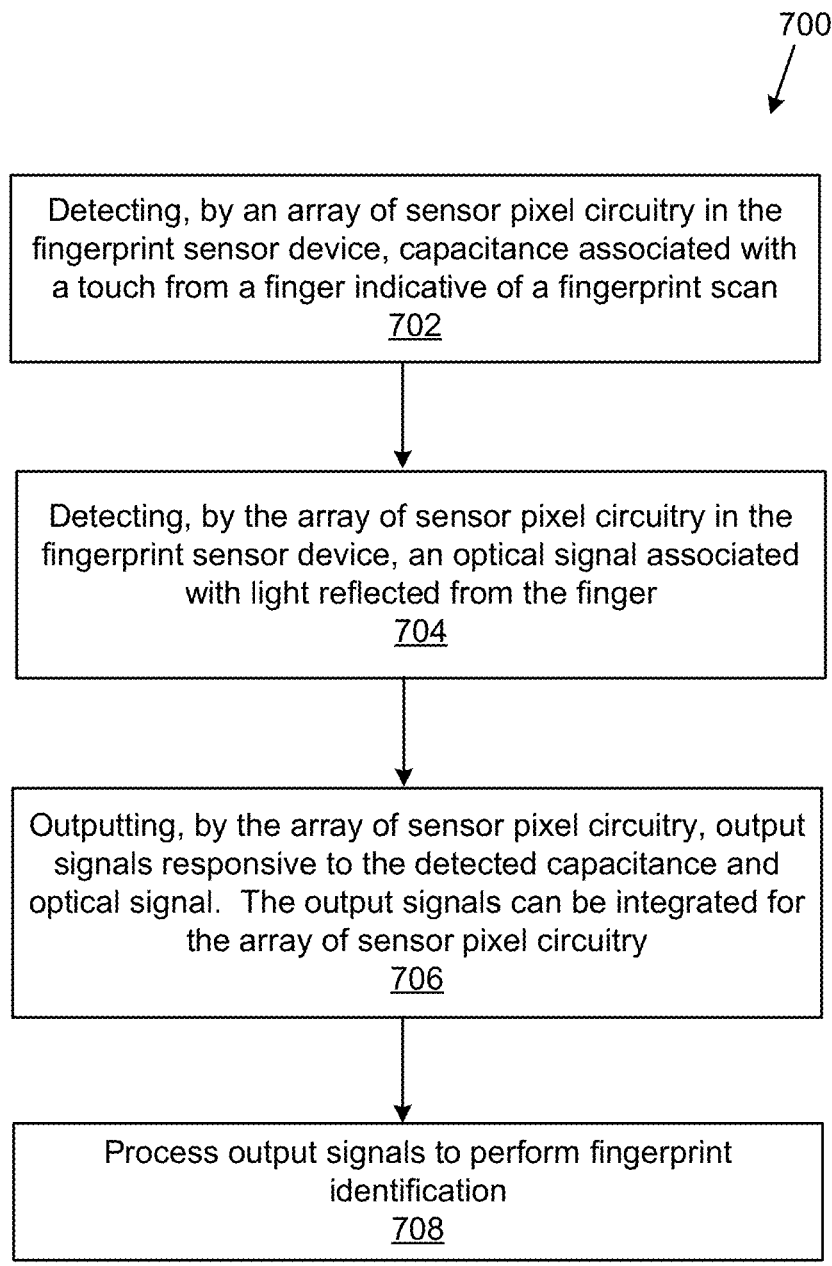
FIGS. 7A, 7B, 7C and 7D show process flow diagrams of an exemplary process for performing fingerprint sensing by a hybrid fingerprint sensor that incorporates optical and capacitive sensors.
Figure 7B:
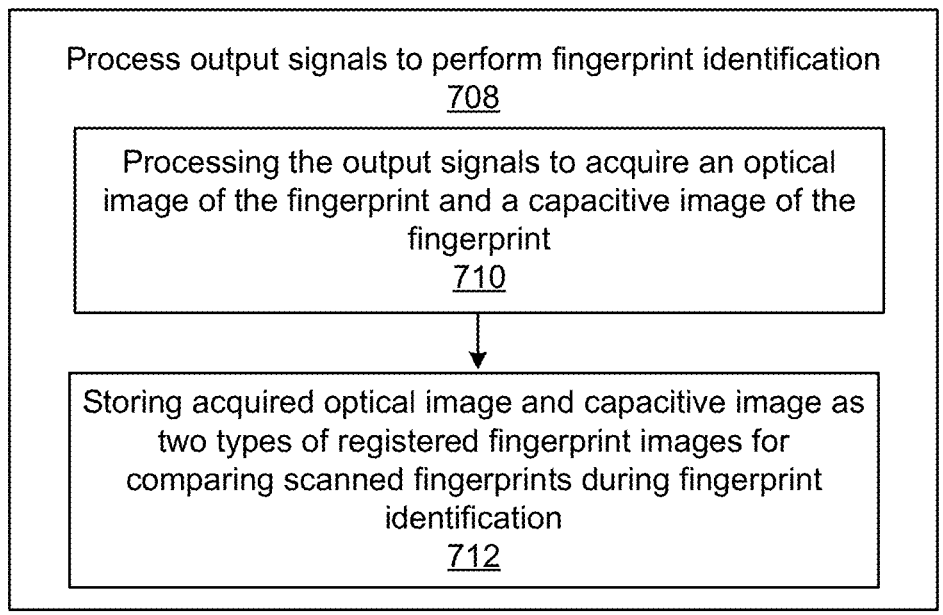
Figure 7C:
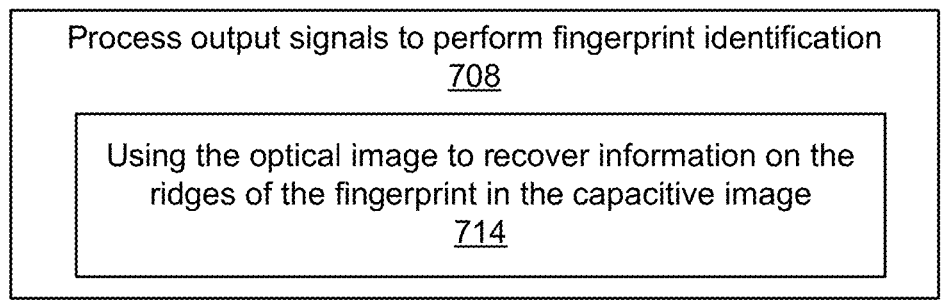
Figure 7D:
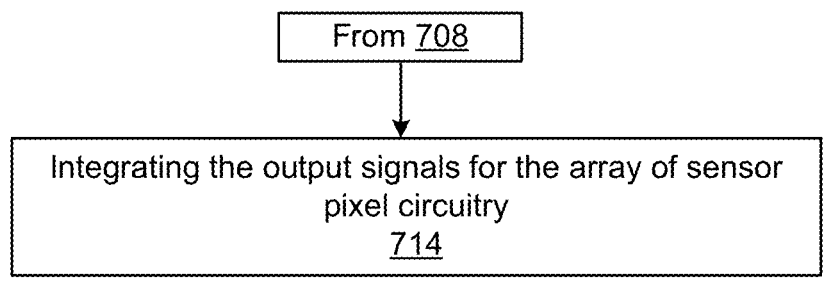

In some implementations, separate instances of sensor signal detection circuitry can be included for the optical and capacitive sensors to detect in parallel the sensor signals from both a photodetector and a capacitive sensor plate. FIG. 6C illustrates a circuit diagram of an exemplary hybrid fingerprint sensing element or pixel 650 for performing parallel detection of sensor signals from the photodetector and the capacitive sensor plate. The hybrid fingerprint sensing element or pixel 650 is substantially the same as the hybrid fingerprint sensing element or pixel 640 with respect to the components having the same reference number. For descriptions of the common components having the same reference number, refer to the description of FIG. 6A.

To perform sensor signal detection from both the capacitive plate and the photodetector in parallel, the hybrid fingerprint sensing element or pixel 650 includes separate sensor signal detection circuitry 616 and 617 communicatively coupled to the sensing top electrode 608 and the photodetector 624 respectively. Sensor signal detection circuitry 617 can be implemented to be substantially similar to sensor signal detection circuitry 616. In some implementations, switches 610 and 612 can be disposed to have first terminals that are electrically coupled to the sensing top electrode 608 and the photodetector 614, respectively, and second terminals that are coupled to respective sensor signal detection circuitry 616 and 617 to provide the optical detector signal from the photodetector 614 and the capacitive sensing signal from the sensing top electrode 608 to the sensor signal detection circuitry 616 and 617 respectively When the switches 610 and 612 are turned on and off together, the sensor signal detection circuitry 616 and 617 can perform sensor signal detection from the capacitive plate 608 and the photodetector 614 in parallel. When the switches 610 and 612 are turned on and off out of phase with each other, the sensor signal detection circuitry 616 and 617 can perform sensor signal detection from the capacitive plate 608 and the photodetector 614 in series. In addition, the sensor device processor 621 can be communicatively coupled to the sensor signal detection circuitry 616 and 617 either directly or indirectly through switches 620 and 621 to process the detected sensor signals from the capacitive plate 608 and the photodetector 614 in parallel or in series.

In another aspect of the disclosed technology, the optical sensor described with respect to FIGS. 1A, 1B, 2, 3A, 3B, 4A, 4B, 5, 6A and 6B can be used to measure human heart beat by measuring the reflected light intensity change with time caused by blood flow variations in fingers due to the heart beat and pumping actions of the heart. This information is contained in the received light that is reflected, scattered or diffused by the finger and is carried by the optical detector signal. Thus, the optical sensor can serve multiple functions including acquiring an optical image of the fingerprint and to measure human heart beat. In implementations, a sensor device processor is used to process one or more optical detector signals to extract the heart beat information. This sensor device processor may be the same sensor device processor that processes the pixel output signals from optical sensing pixels or hybrid sensing pixels to extract the fingerprint information.

FIGS. 7A, 7B, 7C and 7D show process flow diagrams of an exemplary process 700, for performing fingerprint sensing by a hybrid fingerprint sensor that incorporates optical and capacitive sensors. A method 700 formed by a fingerprint sensor device includes detecting, by an array of sensor pixel circuitry in the fingerprint sensor device, capacitance associated with a touch from a finger indicative of a fingerprint scan (702). The method includes detecting, by the array of sensor pixel circuitry in the fingerprint sensor device, an optical signal associated with light reflected from the finger (704). The method includes outputting, by the array of sensor pixel circuitry, output signals responsive to the detected capacitance and optical signal (706). The output signals can be processed to perform fingerprint identification (708). Processing the output signals (708) can include processing the output signals to acquire an optical image of the fingerprint and a capacitive image of the fingerprint (710). The acquired optical image and capacitive image can be stored as two types of registered fingerprint images for comparing scanned fingerprints during fingerprint identification (712). Processing the output signals (708) can include using the optical image to recover information on the ridges of the fingerprint in the capacitive image (714). The output signals can be integrated for the array of sensor pixel circuitry (716). Integrating can include integrating by all of the sensor pixel circuitry in the array the output signals in parallel.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint sensor device for fingerprint detection, comprising:
a light source that emits light at a wavelength; and
an array of sensor pixels located to receive and detect light which includes emitted light from the light source to acquire an optical image indicative of a fingerprint and to reeive a capacitive image indicative of the fingerprint,
each sensor pixel including:
a photodetector configured to detect the emitted light reflected off of a target finger and output a photodetector signal based on the detected reflected light;
different collimators coupled to the photodetector, each collimator structured to include an optical transmission path with a small numerical aperture to collect and direct the reflected light from above the photodetector toward the photodetector in incident directions along the optical transmission path without an optical lens while blocking incident light in incident directions at large angles with respect to the optical transmission path, wherein the different collimators to allow the collimators to block light that directly comes from the light emitting diode from emitting each photodetector;
an electrically conductive electrode that can be capacitively coupled to a local part of the touched portion of the finger, forming a fingerprint associated capacitor that outputs a capacitive signal representing a respective capacitive value for the fingerprint that is separate from the photodetector signal from a photodetector within the same sensor pixel representing a portion of an optical image indicative of the fingerprint, wherein the array of sensor pixels is located to capacitively couple with a touched portion of a finger to form an array of fingerprint associated capacitors having capacitive values indicative of a fingerprint; and
sensor signal detection circuitry communicatively coupled to the photodetector to receive the photodetector signal and to receive the capacitive signal.

2. The fingerprint sensor device of claim 1, wherein the light source includes a light emitting diode located at a peripheral location outside an area of the different collimators to allow the collimators to collect only light from the above the photodetector in incident directions along optical transmission paths of the different collimators.

3. The fingerprint sensor device of claim 1, comprising metal electrodes that are patterned to form the collimators, wherein each metal electrode is structured to form a hole through the metal electrode as a collimator.

4. The fingerprint sensor device of claim 1, wherein the different collimators coupled to a corresponding photodetector include an optical fiber bundle.

5. The fingerprint sensor device of claim 1, including:
sensor switching circuitry coupled to the sensor signal detection circuitry and operable to switch between electrically connecting the sensor signal detection circuitry to the photodetector to receive the photodetector signal and to the electrically conductive electrode to receive the capacitive signal, within a sensor pixel.

6. The fingerprint sensor device of claim 5, wherein the sensor signal detection circuitry includes:
an integrator electrically coupled to the sensor switching circuitry to integrate electrical charges associated with the fingerprint associated capacitor responsive to a touch by a finger of a user or the photodetector signal from the photodetector.

7. The fingerprint sensor device of claim 6, wherein the integrator comprises:
a reference voltage generator configured to generate a reference voltage;
an amplifier, comprising:
a positive input terminal electrically coupled to the reference voltage generator to receive the reference voltage;
a negative input terminal electrically coupled to the sensor switching circuitry; and
an output terminal of the amplifier;
an integrating capacitor electrically coupled between the negative input terminal and the output terminal of the amplifier; and
a reset switch electrically coupled between the negative input terminal and the output terminal of the amplifier.

8. The fingerprint sensor device of claim 7, wherein the reference voltage generator is configured to vary the generated reference voltage.

9. The fingerprint sensor device of claim 8, wherein the reference voltage generator includes a digital to analog converter to vary the generated reference voltage.

10. The fingerprint sensor device of claim 1, wherein the capacitive signal associated with the fingerprint associated capacitor represents information on a ridge or a valley of a finger.

11. The fingerprint sensor device of claim 1, further comprising:
a sensor processor coupled to receive an output of the sensor signal detection circuitry based on photodetector signals generated from sensing collected light at the photodetectors carrying information on the heartbeat of a user and process the received output to measure the heart beat.

12. A fingerprint sensor device for fingerprint identification, comprising:
an array of sensor pixel circuitry arranged to form groups of electrically connected sensor pixel circuitry operable to capture fingerprint pattern of a touched portion of a finger, each sensor pixel circuitry in the array including:
a light source that emits light at a wavelength;
a photodetector located to receive and to detect the emitted light reflected off of the touch portion of the finger to produce a photodetector signal indicating a portion of an optical image of fingerprint of the finger; and
an electrically conductive electrode located to be capable of being capacitively coupled to a local part of the touched portion of the finger to form a fingerprint associated capacitor to produce a capacitive signal representing a respective capacitive value at the local part of the finger as a separate representation of the fingerprint from the photodetector signal within the same sensor pixel circuitry, wherein the electrically conductive electrode is disposed above the photodetector and structured to form a hole through the electrically conductive electrode to collimate the reflected light in a vertical direction from above the electrically conductive electrode toward the photodetector; and
sensor signal detection circuitry coupled to the array of sensor pixel circuitry to receive capacitive signals and photodetector signals and operable to capture the fingerprint pattern based on the capacitive signals and photodetector signals.

13. The fingerprint sensor device of claim 12, further comprising:
sensor switching circuitry configured to switch between electrically connecting the sensor signal detection circuitry to the photodetector and to the electrically conductive electrode in each sensor pixel circuitry;
wherein the sensor signal detection circuitry is configured to acquire an optical signal form the photodetector when electrically connected to the photodetector through the sensor switching circuitry and to acquire a capacitive signal from the electrically conductive electrode when electrically connected to the electrically conductive electrode.

14. The fingerprint sensor device of claim 13, wherein the sensor signal detection circuitry includes:
an integrator to store electrical charges associated with the charged fingerprint associated capacitor responsive to a touch by a finger of a user.

15. The fingerprint sensor device of claim 14, wherein the integrator comprises:
a reference voltage generator configured to generate a reference voltage;
an amplifier, comprising:
a positive input terminal electrically coupled to the reference voltage generator to receive the reference voltage;
a negative input terminal electrically coupled to the sensor switching circuitry; and
an output terminal of the amplifier;
an integrating capacitor electrically coupled between the negative input terminal and the output terminal of the amplifier; and
a reset switch electrically coupled between the negative input terminal and the output terminal of the amplifier.

16. The fingerprint sensor device of claim 13, wherein:
the sensor switching circuitry is operable to generate a control signal to control each sensor pixel circuitry in the array to integrate the output signal in each sensor pixel circuitry in the array in parallel.

17. The fingerprint sensor device of claim 12, further comprising:
a sensor processor coupled to receive an output of the sensor signal detection circuitry based on an output of the photodetector of one or more sensor pixels and process the received output to measure a heart beat of a user from light reflected from a finger of the user that is detected by the photodetector in the one or more sensor pixels.

18. A method for operating a fingerprint sensor device to detect a fingerprint, the method comprising:
detecting, by an array of sensor pixel circuitry in the fingerprint sensor device in which each sensor pixel includes a capacitive sensor and an optical sensor, capacitance values detected by capacitor sensors in different sensor pixels at different locations associated with a touch from a finger indicative of a fingerprint;
detecting, by optical sensors in the array of sensor pixel circuitry in the fingerprint sensor device, optical signals at the different locations associated with light reflected from the finger, wherein the optical signals collectively represent an optical image of the fingerprint;
outputting, by the array of sensor pixel circuitry, output signals that represent the detected capacitance values and optical signals; and
processing output signals to perform fingerprint identification, wherein processing the output signals includes enhancing the capacitive image to provide more information on valleys and ridges of the fingerprint by interpolating or recovering based on high resolution spatial information in the optical image.

19. The method of claim 18, wherein processing the output signals includes processing the output signals to acquire an optical image of the fingerprint and a capacitive image of the fingerprint.

20. The method of claim 19, comprising:
storing the acquired optical image and capacitive image as two types of registered fingerprint images for comparing scanned fingerprints during fingerprint identification.

21. The method of claim 19, wherein processing the output signals includes using the optical image to recover information on the ridges of the fingerprint in the capacitive image.

22. The fingerprint sensor device of claim 1, comprising:
different metal layers that are stacked and patterned to form the collimators.

23. The fingerprint sensor device of claim 1, comprising:
different layers of metal grids with openings to form the collimators.

24. The fingerprint sensor device of claim 1, comprising:
a silicon-based on multilayer structure that includes (1) bottom layers patterned to form photodetectors of the sensor pixels and (2) one or more metal layers formed over the bottom layers as the collimators have vertical optical transparent passages to collect and direct light to the photodetectors.

25. The fingerprint sensor device of claim 1, wherein, in each sensor pixel, the electrically conductive electrode is located above a corresponding photodetector within the same sensor pixel and includes a hole to allow transmission of light from the electrically conductive electrode to the photodetector.

26. The fingerprint sensor device of claim 1, wherein, in each sensor pixel, the electrically conductive electrode is located side by side with a corresponding photodetector within the same sensor pixel.

\* \* \* \* \*